UNITED STATES PATENT OFFICE.

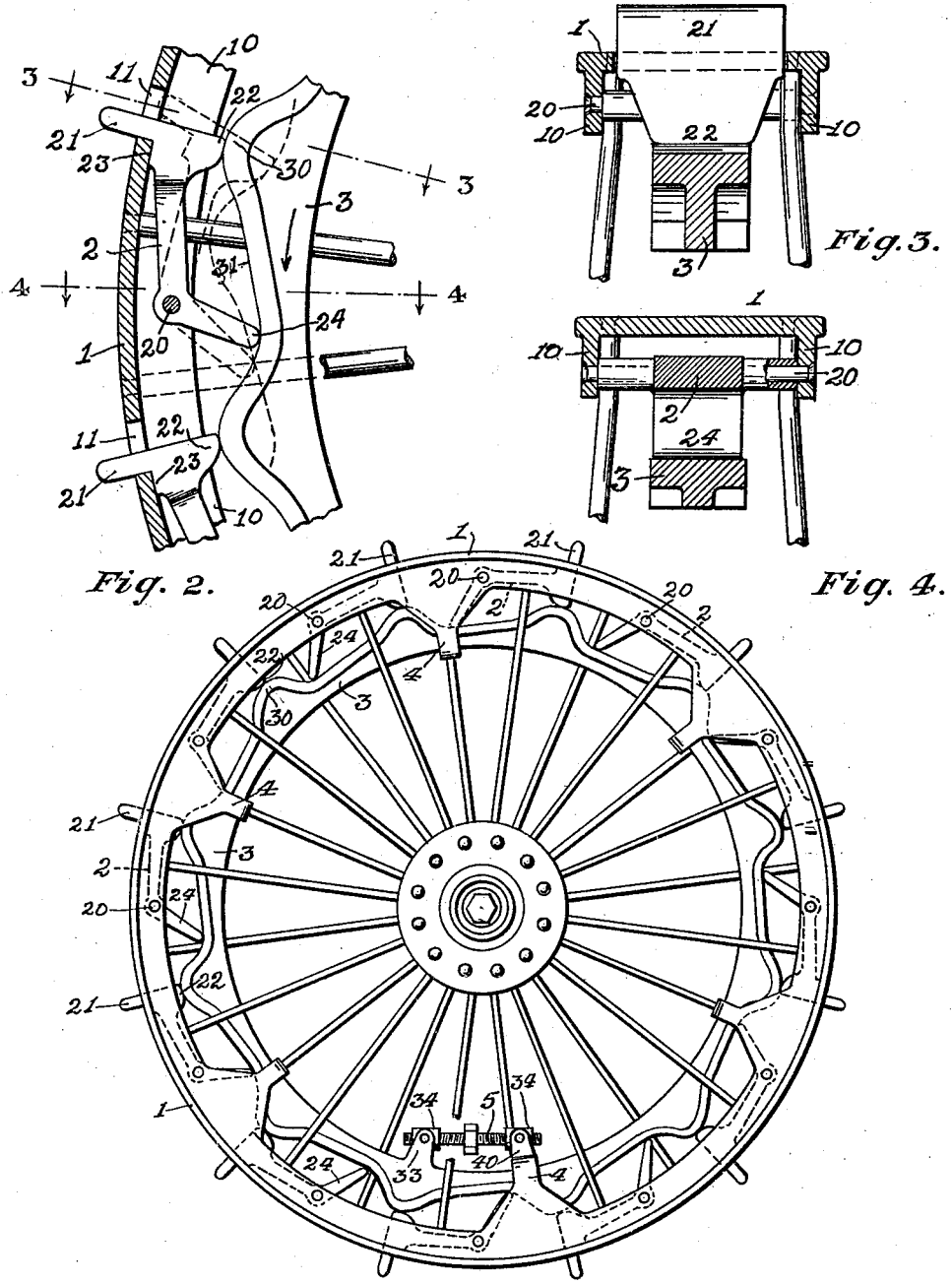

JOHN A. THOMPSON, OF SEDRO WOOLLEY, WASHINGTON, ASSIGNOR TO PERFECTO GEAR DIFFERENTIAL CO., OF SEATTLE, WASHINGTON, A CORPORATION OF WASHINGTON.

TRACTOR-WHEEL.

1,318,512.     Specification of Letters Patent.     Patented Oct. 14, 1919.

Application filed December 9, 1918. Serial No. 265,864.

*To all whom it may concern:*

Be it known that I, JOHN A. THOMPSON, a citizen of the United States, and resident of Sedro Woolley, Washington, have invented certain new and useful Improvements in Tractor-Wheels, of which the following is a specification.

My invention relates to traction wheels and consists of a wheel that is provided with means whereby its tractive power may be largely increased by the projection of ground-gripping blades, and which may have these blades retracted so that it may be run over paved roads without injuring the same.

The object of my invention is to provide a wheel having a mechanism of this sort, which shall be strong and effective in operation, and which may be readily adjusted so as to make use of the additional tractive capacity when it is desired, and which may be quickly adjusted so as to retract the projecting flanges, whenever it is desired to run over hard roads.

My invention consists of certain novel parts and combinations of parts which will be described in the specification and then particularly defined in the claims. The accompanying drawings show my invention in the form of construction which I now prefer.

Figure 1 is a side view of a wheel, constructed in accordance with my invention.

Fig. 2 is a section taken in a plane parallel with the general plane of the wheel, showing a small section of the rim portions of the wheel.

Figs. 3 and 4 are cross sections of the wheel rim taken respectively on the lines 3—3 and 4—4 of Fig. 2.

In the present invention it is desired to provide means, such as flanges or bars, which may be projected through the rim of the wheel, so as to provide ground-gripping blades, to thereby increase the tractive effect, and to do this in such manner that whenever desired these may be readily retracted, to thereby adjust the wheel for traveling over hard roads without any danger of the same injuring the road.

As herein constructed, the wheel is provided with a rim 1, which is of metal construction, and has a cross sectional outline resembling the rolled metal form which is usually referred to as a channel bar. In other words, it has two flanges, 10, located at the sides of the rim and extending inwardly, or toward the center of the wheel.

The rim is provided with holes 11, preferably in the form of slots, which extend transversely across the wheel rim, but which stop short of the outer edges of said rim. The extent of these slots are clearly shown in Fig. 3.

A series of ground-gripping members are provided, one for each of these slots. These members consist of a lever 2, which is journaled by means of a pin 20, to the flanges 10 of the wheel rim. These pivots 20 are placed intermediate the slots 11. One arm of the lever 2 is provided, at its outer or swinging end, with a flange 21 which is so positioned that when the lever is mounted in the wheel, the flange 21 lies substantially radially of the wheel.

The point of pivoting of the lever 2, together with the length of this arm and the base of the flange 21 relative to the slot 11, is preferably such that when the ground gripping member, consisting of the lever 2, is swung outwardly so as to project the flange 21 from the periphery of the wheel, the base of this flange is abutting against one edge of the slot 11. The location of these parts would be chosen so that the edge of the slot, against which the flange 21 bears when in its outer position, would be the one toward which the turning effort communicated by the wheel would naturally tend to force this flange when running in the direction in which it would be chiefly operated while working.

By locating it in this manner the tractive strain is communicated from this flange directly to the wheel rim, instead of through the pivot 20. In consequence, the strength of the connection between the ground-gripping member 2 and the wheel rim 1 does not depend upon the size of the pivot pin 20.

Mounted inside of the rim 1 is a cam ring 3. This cam ring 3 has a series of outwardly extending projections 30, in number corresponding with the ground-gripping dogs. They are spaced about its periphery in conformity with the spacing of said dogs. The diameter of the cam ring 3, measuring from the outer surface of these cam projections 30, is such that when they engage with the inner projection 22 of the ground-gripping member, the flanges or dogs 21, are at their outermost projections.

In this condition, a flat shoulder or bearing surface, 23, which extends laterally from and at the base of the flange or dog 21, is in bearing contact with the inner surface of the peripheral web of the wheel 1. In consequence, the inner flange ring 3 tends by its strength to somewhat support the wheel.

Upon the opposite end of the ground-gripping member 2 is an arm 24, which extends inwardly and at an angle with the radius of the wheel such that, when the ring 3 is turned in the direction indicated by the arrow in Fig. 2, the cam surface 31 will force this arm 24 outwardly. The outer surface of the cam projection 30 is so proportioned with reference to the arm 24 and the surface 31, that, as the arm 24 is thrown outward the foot or inner portion 22 of the head at the other end of the lever, slides down upon the flank of the projection 30. This action is indicated by the dotted-line position of the parts as shown in Fig. 2.

These parts are so proportioned that a comparatively short adjustment of the ring 3, circumferentially with relation to the wheel rim 1, will cause the ground-gripping dogs to be retracted so that the wheel then has a smooth outer surface and is thus adapted for running over hard-surfaced roads without injuring them.

To assist in the proper support and location of the cam ring 3 within the wheel, I provide a series of stirrups 4, which are carried by the rim 1 and which extend under or around the cam ring 3. Together with the above parts I provide some means whereby the peripheral adjustment of the cam ring 3, with relation to the wheel rim 1, may be positively secured and maintained after being secured. As herein shown, I secure this adjustment in the following manner.

Upon the cam ring 3 I provide ears or bosses 33, between which is pivotally mounted a nut 34. Upon the wheel rim, or rather upon one of the stirrups 4 thereof, are corresponding ears 40, having a similar nut 34 pivotally mounted therein. With these I also provide a right-and-left hand threaded bolt 5, entering the nuts 34, the nuts 34 being similarly right-and-left hand threaded.

It is evident that by turning this bolt in one direction the ears 33 and 40 will separate, while by turning the bolt in the opposite direction, they will be brought closer together, and in this manner the circumferential adjustment between the cam ring 3 and the wheel rim 1 is secured, and when so secured, will be maintained until the bolt is again turned.

As the adjustment of this sort will only be occasionally required, I do not deem it necessary to provide any means whereby this adjustment may be accomplished by the operator while riding upon the tractor, or other vehicle, which is being carried by such wheel.

What I claim as my invention is:

1. A traction wheel comprising a rim having holes therein, a cam ring within said rim and adjustable circumferentially with relation thereto, and ground gripping dogs pivoted to and at the inner side of the rim, said dogs having blades at one end adapted to be projected through the holes in the rim, the other end of the dogs having an inwardly projecting end, the cam ring having an outer cam surface engaging both ends of said dogs to project the blades at one end through the rim when in one adjusted position and to draw these ends within the rim when in another adjusted position.

2. A traction wheel having a rim provided with transversely extending slots at intervals about its circumference, gripping members in the form of levers pivoted to and at the inner side of the rim between said slots, said gripping members having at one end blades adapted to be projected through said slots and at the other end controlling arms extending inwardly upon an angle, and a controlling ring mounted within the rim and adjustable circumferentially with relation thereto, said controlling ring having outwardly extending cam projections adapted by adjustment to engage either end of said gripping members to thereby project or withdraw the blades thereof.

3. A traction wheel having a rim provided with transverse slots spaced about its circumference, gripping members consisting of levers pivoted to the inside of the rim between said slots and having upon one end blades adapted to be projected outwardly through said slots and upon its other end controlling arms extending inwardly, a controlling ring within the rim and adjustable circumferentially of the rim, restraining stirrups carried by the rim and extending about said ring, means connecting the ring and rim to secure relative circumferential adjustment, said ring having outwardly extending cam projections adapted by circumferential adjustment to engage opposite ends of said gripping members to project and withdraw the blades thereof.

4. A traction wheel having a rim provided with transverse slots spaced about its circumference, gripping members consisting of levers pivoted to the inside of the rim between said slots and having upon one end blades adapted to be projected outwardly through said slots and upon its other end controlling arms extending inwardly, a controlling ring within the rim and adjustable circumferentially of the rim, restraining stirrups carried by the rim and extending about said ring, a right-and-left threaded bar connecting the ring and rim to secure relative circumferential adjustment, said ring having outwardly extending cam projections adapted by circumferential adjustment to engage opposite ends of said gripping members to project and withdraw the blades thereof.

5. A traction wheel having a series of levers pivoted thereon with one end adapted to be projected outwardly of the wheel rim to serve as ground grips, a series of cams connected to be moved together and engaging said levers to positively project and withdraw them.

6. A traction wheel having holes in its rim, a series of levers pivoted at the inner side of the rim and having one end adapted to be projected through said holes to serve as ground grips, and a series of cams connected to move together and adapted to engage said levers to positively project and withdraw said ground gripping ends.

Signed at Seattle, Washington, this 28th day of November, 1918.

JOHN A. THOMPSON.

Copies of this patent may be obtained for five cents each, by addressing the "Commissioner of Patents, Washington, D. C."